United States Patent
Wakabayashi et al.

(10) Patent No.: US 11,064,558 B2
(45) Date of Patent: Jul. 13, 2021

(54) TELECOMMUNICATIONS APPARATUSES AND METHODS

(71) Applicant: SONY CORPORATION, Tokyo (JP)

(72) Inventors: Hideji Wakabayashi, Basingstoke (GB); Yuxin Wei, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/772,409

(22) PCT Filed: Sep. 21, 2016

(86) PCT No.: PCT/EP2016/072436
§ 371 (c)(1),
(2) Date: Apr. 30, 2018

(87) PCT Pub. No.: WO2017/080704
PCT Pub. Date: May 18, 2017

(65) Prior Publication Data
US 2018/0324891 A1    Nov. 8, 2018

(30) Foreign Application Priority Data
Nov. 9, 2015  (EP) .................................... 15193709

(51) Int. Cl.
*H04W 76/28* (2018.01)
*H04W 76/14* (2018.01)
(Continued)

(52) U.S. Cl.
CPC ........... *H04W 76/28* (2018.02); *H04W 76/14* (2018.02); *H04W 76/15* (2018.02); *H04W 76/27* (2018.02); *H04W 88/04* (2013.01); *H04W 76/23* (2018.02)

(58) Field of Classification Search
None
See application file for complete search history.

(56) References Cited

U.S. PATENT DOCUMENTS 9,198,112 B2 * 11/2015 Ulupinar ............... H04W 76/12
2011/0194485 A1    8/2011 Horneman et al.
(Continued)

FOREIGN PATENT DOCUMENTS

| WO | WO 2010/034349 A1 | 4/2010 |
| WO | WO 2013/086324 A1 | 6/2013 |
| WO | WO 2015/061418 A1 | 4/2015 |

OTHER PUBLICATIONS

International Search Report dated Dec. 12, 2016, in PCT/EP2016/072436 filed Sep. 21, 2016.
(Continued)

*Primary Examiner* — Ruihua Zhang
(74) *Attorney, Agent, or Firm* — Xsensus LLP

(57) ABSTRACT

A method for use in a mobile telecommunications network, the mobile telecommunications network including a base station providing wireless connectivity within a base station cell, a mobile node providing wireless connectivity within a local cell and configured to communicate with the base station, and a terminal configured to communicate wirelessly with the base station and configured to communicate wirelessly with the mobile node. The method includes: activating a limited base station radio connection between the terminal and the base station; and activating one of a full local radio connection and a limited local radio connection between the terminal and the mobile node.

18 Claims, 7 Drawing Sheets

(51) Int. Cl.
*H04W 76/27* (2018.01)
*H04W 76/15* (2018.01)
*H04W 88/04* (2009.01)
*H04W 76/23* (2018.01)

(56) References Cited

U.S. PATENT DOCUMENTS

| | | | |
|---|---|---|---|
| 2014/0321367 A1* | 10/2014 | Marupaduga | H04W 88/04 370/329 |
| 2014/0321416 A1 | 10/2014 | Pragada et al. | |
| 2014/0349694 A1* | 11/2014 | Raghothaman | H04W 36/00 455/509 |
| 2015/0099514 A1* | 4/2015 | Sartori | H04W 8/005 455/434 |
| 2015/0117193 A1 | 4/2015 | Marupaduga et al. | |
| 2016/0219636 A1* | 7/2016 | Fujishiro | H04W 72/02 |
| 2017/0026954 A1* | 1/2017 | Kawasaki | H04W 72/0413 |
| 2017/0208640 A1* | 7/2017 | Kim | H04W 76/14 |
| 2018/0054755 A1* | 2/2018 | Lee | H04W 72/1284 |
| 2018/0124117 A1* | 5/2018 | Delsol | H04L 63/20 |
| 2018/0295497 A1* | 10/2018 | Kim | H04W 8/08 |

OTHER PUBLICATIONS

Holma, H. et al., "LTE for UMTS OFDMA and SC-FDMA Based Radio Access", John Wiley & Sons, (2009), 8 pages.
ETSI TS 136 331, Technical Specification, "LTE; Evolved Universal Terrestrial Radio Access (E-UTRA); Radio Resource Control (RRC); Protocol specification" (3GPP TS 36.331 version 12.7.0 Release 12), Oct. 2015, 455 pages.
Office Action received in European Application 16 775 545.3-1231 dated Feb. 8, 2019.

* cited by examiner

TELECOMMUNICATIONS APPARATUSES AND METHODS

FIELD

The present disclosure relates to telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which there is a desire for a group of terminal devices (communications devices) to exchange information with each other in a fast and reliable manner. In order to help address these limitations there have been proposed approaches in which terminal devices within a wireless telecommunications system may be configured to communicate data directly with one another without some or all their communications passing through an infrastructure equipment element, such as a base station. Such communications are commonly referred to generally as a device-to-device (D2D) communications. Many device-to-device communications may be transmitted by one device to a plurality of other devices in a broadcast like manner and so in that sense the phrase "device-to-device communications" also covers "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

In parallel, the development of relay nodes in telecommunications system is expected to facilitate communications with the base stations and potentially to expand the range of coverage of the base stations by relaying communications between terminal devices and base stations. However, due to the complexity of D2D arrangements and in particular to the lack of centralised control points (like the base stations in a conventional mobile network), there is at present a lack of relaying solutions for D2D communications.

SUMMARY

According to a first example aspect, there is provided a method for use in a mobile telecommunications network, the mobile telecommunications network comprising a base station providing wireless connectivity within a base station cell, a mobile node providing wireless connectivity within a local cell and configured to communicate with the base station and a terminal configured to communicate wirelessly with the base station and configured to communicate wirelessly with the mobile node; the method comprising: activating a limited base station radio connection between the terminal and the base station; and activating one of a full local radio connection and a limited local radio connection between the terminal and the mobile node.

According to a second example aspect, there is provided a mobile telecommunications network, the mobile telecommunications network comprising a base station providing wireless connectivity within a base station cell, a mobile node providing wireless connectivity within a local cell and configured to communicate with the base station and a terminal configured to communicate wirelessly with the base station and configured to communicate wirelessly with the mobile node; wherein the mobile telecommunications network is configured to: activate a limited base station radio connection between the terminal and the base station; and activate one of a full local radio connection and a limited local radio connection between the terminal and the mobile node.

According to a third example aspect, there is provided a mobile telecommunications network, the mobile telecommunications network comprising a base station providing wireless connectivity within a base station cell, a mobile node providing wireless connectivity within a local cell and configured to communicate with the base station and a terminal configured to communicate wirelessly with the base station and configured to communicate wirelessly with the mobile node; wherein the mobile telecommunications network is configured to carry out any one of the method above and to any of its variations within the scope of the claims.

According to a fourth example aspect, there is provided a method of operating a terminal use in a mobile telecommunications network, the mobile telecommunications network comprising a base station providing wireless connectivity within a base station cell, a mobile node providing wireless connectivity within a local cell and configured to communicate with the base station; wherein the terminal comprises a transmitter, a receiver and a controller and is configured to communicate wirelessly with the base station and to communicate wirelessly with the mobile node; the method comprising: the terminal activating a limited base station radio connection between the terminal and the base station; and the terminal activating one of a full local radio connection and a limited local radio connection between the terminal and the mobile node.

According to a fifth example aspect, there is provided a terminal for use in a mobile telecommunications network, the mobile telecommunications network comprising a base station providing wireless connectivity within a base station cell, a mobile node providing wireless connectivity within a local cell and configured to communicate with the base station; wherein the terminal comprises a transmitter, a receiver and a controller and is configured to communicate wirelessly with the base station and to communicate wirelessly with the mobile node, wherein the terminal is further configured to: activate a limited base station radio connection between the terminal and the base station; and activate one of a full local radio connection and a limited local radio connection between the terminal and the mobile node.

According to a sixth example aspect, there is provided circuitry for a terminal for use in a mobile telecommunications network, the mobile telecommunications network comprising a base station providing wireless connectivity within a base station cell, a mobile node providing wireless connectivity within a local cell and configured to communicate with the base station; wherein the circuitry comprises a controller element and a transceiver element configured to operate together to communicate wirelessly with the base station and to communicate wirelessly with the mobile node; activate a limited base station radio connection between the terminal and the base station; and activate one of a full local radio connection and a limited local radio connection between the terminal and the mobile node.

According to a seventh example aspect, there is provided a method of operating a mobile node in a mobile telecommunications network, the mobile telecommunications network comprising a base station providing wireless connectivity within a base station cell, wherein the mobile node is configured to provide wireless connectivity within a local cell and configured to communicate with the base station; and a terminal configured to communicate wirelessly with the base station and configured to communicate wirelessly with the mobile node, the method comprising the mobile node: activating one of a full local radio connection and a limited local radio connection with the terminal while a limited base station radio connection is activated between the terminal and the base station.

According to a eighth example aspect, there is provided a mobile node for use in a mobile telecommunications network, the mobile telecommunications network comprising a base station providing wireless connectivity within a base station cell, wherein the mobile node is configured to provide wireless connectivity within a local cell and configured to communicate with the base station; and a terminal configured to communicate wirelessly with the base station and configured to communicate wirelessly with the mobile node, the mobile node comprising a transmitter, a receiver and a controller and is configured to: activate one of a full local radio connection and a limited local radio connection with the terminal while a limited base station radio connection is activated between the terminal and the base station.

According to a ninth example aspect, there is provided circuitry for a mobile node for use in a mobile telecommunications network, the mobile telecommunications network comprising a base station providing wireless connectivity within a base station cell, wherein the circuitry comprises a controller element and a transceiver element configured to operate together to provide wireless connectivity within a local cell and to communicate with the base station; and a terminal configured to communicate wirelessly with the base station and configured to communicate wirelessly with the mobile node, the controller element and transceiver element being further configured to operate together to: activate one of a full local radio connection and a limited local radio connection with the terminal while a limited base station radio connection is activated between the terminal and the base station.

According to a tenth example aspect, there is provided a method of operating a base station in a mobile telecommunications network, the base station comprising a transmitter, a receiver and a controller and being configured to provide wireless connectivity within a base station cell, the mobile telecommunications network comprising the base station, a mobile node providing wireless connectivity within a local cell and configured to communicate with the base station and a terminal configured to communicate wirelessly with the base station and configured to communicate wirelessly with the mobile node; the base station being configured to: activate a limited base station radio connection with the terminal while one of a full local radio connection and a limited local radio connection is activated between the terminal and the mobile node.

According to a eleventh example aspect, there is provided a base station for use in in a mobile telecommunications network, the base station comprising a transmitter, a receiver and a controller and being configured to provide wireless connectivity within a base station cell, the mobile telecommunications network comprising the base station, a mobile node providing wireless connectivity within a local cell and configured to communicate with the base station and a terminal configured to communicate wirelessly with the base station and configured to communicate wirelessly with the mobile node; the base station being configured to: activate a limited base station radio connection with the terminal while one of a full local radio connection and a limited local radio connection is activated between the terminal and the mobile node.

According to a twelfth example aspect, there is provided circuitry for a base station for use in in a mobile telecommunications network, the circuitry comprises a controller element and a transceiver element configured to operate together to provide wireless connectivity within a base station cell, the mobile telecommunications network comprising the base station, a mobile node providing wireless connectivity within a local cell and configured to communicate with the base station and a terminal configured to communicate wirelessly with the base station and configured to communicate wirelessly with the mobile node; the controller element and transceiver element being further configured to operate together to: activate a limited base station radio connection with the terminal while one of a full local radio connection and a limited local radio connection is activated between the terminal and the mobile node.

According to a thirteenth example aspect and to a fourteenth example aspect, there are provided computer software which, when executed by a computer, causes the computer to perform any of the above method (and any of their variations falling within the scope of the claims) and a storage medium which stores the computer software, respectively.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
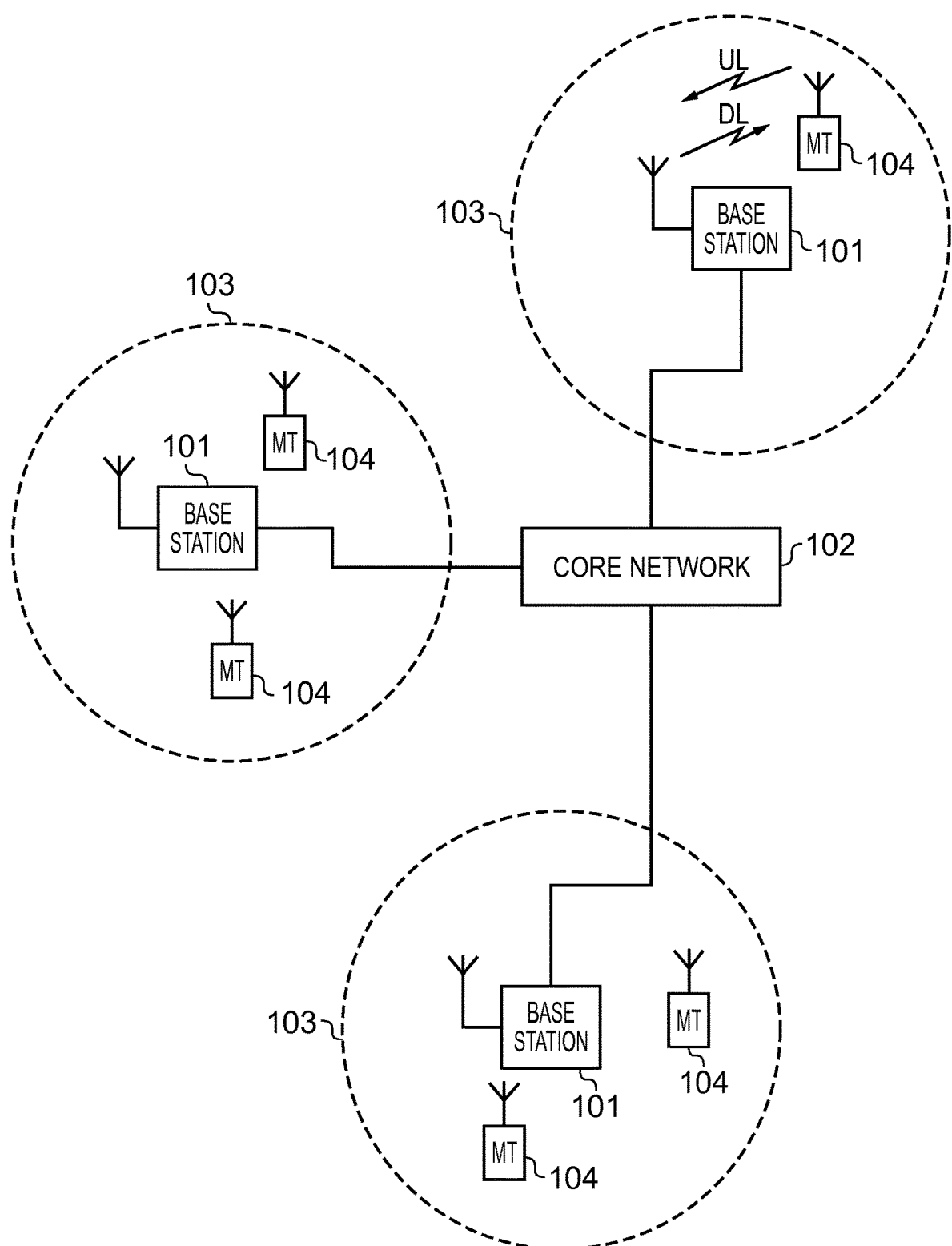
FIG. 1 provides a schematic diagram illustrating an example of a mobile telecommunication system.

FIG. 1 provides a schematic diagram illustrating some basic functionality of a mobile (cellular) telecommunications network/system, in this example operating generally in accordance with LTE principles, and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network. The core network 102 routes data to and from the terminal devices 104 via the respective base stations 101 and provides functions such as authentication, mobility management, charging and so on. In addition to the base stations 101 and terminal devices 104, the system may further comprise one or more relay nodes/devices. These may be used to enhance coverage for terminal devices operating in the relevant cell(s). The deployment of relay nodes (e.g. in terms of their locations) may follow generally established techniques for using relay nodes to support coverage in wireless telecommunications systems by assisting downlink and/or uplink communications. In terms of terminology, it will be appreciated that terminal devices may also be referred to as mobile stations, user equipment (UE), user terminal, terminal, mobile radio, mobile terminal, mobile device and so forth. Similarly, base stations may also be referred to as transceiver stations/nodeBs/e-nodeBs, eNBs and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
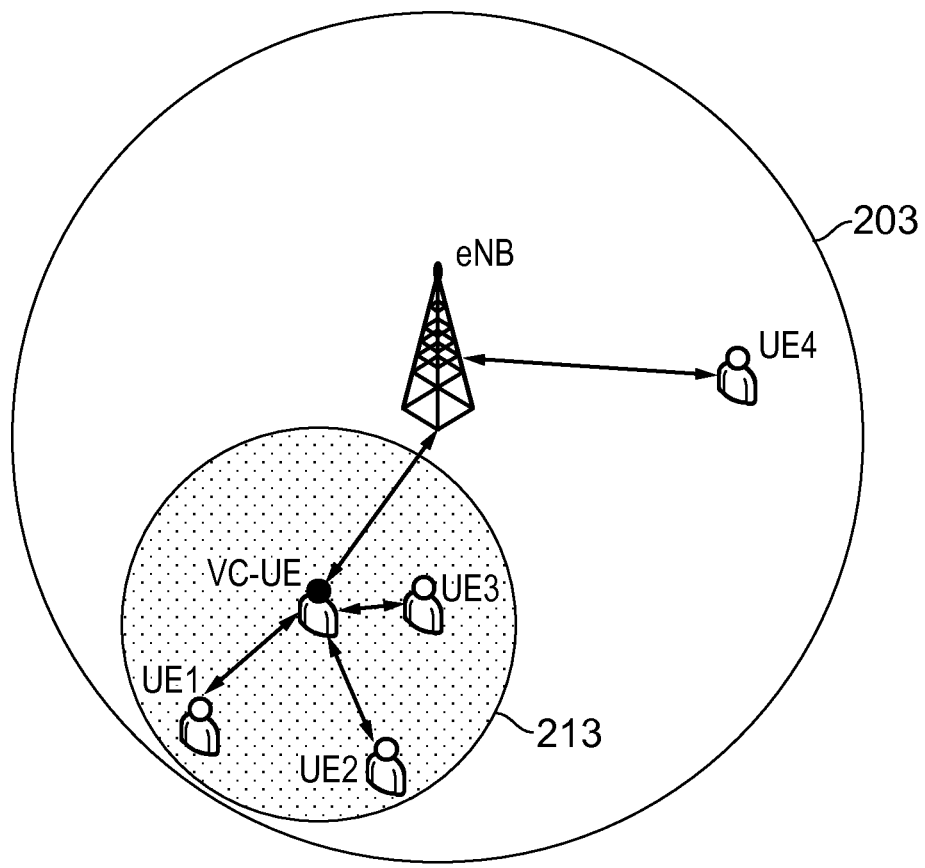
FIG. 2 schematically represents an example local cell arrangement.

It has been suggested that a UE might operate a local cell or virtual cell, that is, that the terminal will operate as an intermediate node between UEs in its vicinity and the network, as well as an intermediate node between UEs. In other words, the UE can communicate with neighbouring UEs and provides them with connectivity to the base station (e.g. to reach the core network) and potentially to other neighbouring UEs as well. FIG. 2 schematically represents an example local cell arrangement. A base station eNB provides connectivity in a cell 203 (sometimes hereinafter referred to as a "base station cell" or simply "cell" if it is clear from the context that the cell is that provided by a base station). At the same time, a UE "VC-UE" (for Virtual Cell UE) can provide connectivity via a virtual cell or local cell 213. In the example of FIG. 2, the VC-UE provides mobile connectivity to the three terminals UE1-UE3 while terminal UE4 is connected directly to the base station. In this example, only one virtual cell ("VC") is provided in the cell although in some examples more VC may be activated, or no VC may be activated.

Figure 3:
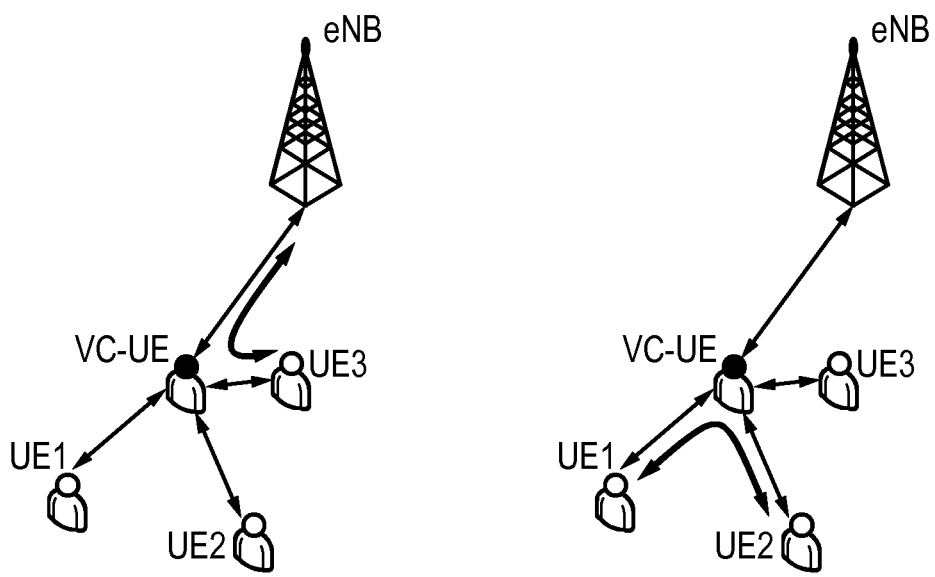
FIG. 3 schematically represents examples communication paths in a local cell arrangement.

FIG. 3 schematically represents examples communication paths in a local cell arrangement as illustrated in FIG. 2. In the first example (left-hand side), the VC-UE provides UE3 with a wireless connectivity to the base station, for example to reach the core network or a remote destination outside of the mobile network (e.g. a public server available from the internet). UE3 is connected to the VC-UE and uses it as if it were a base station and the VC-UE sends the messages to the base station if need be (e.g. messages for a remote destination, the base station, the core network, etc.), thereby offering connectivity to the base station. In the second example (right-hand side) of FIG. 3, it is also illustrated how a VC-UE can offer connectivity to other UEs in the local cell. For example, if UE1 and UE2 wish to communicate with each other, the VC-UE can identify that the destination for the messages is within its local cell and thus sends the messages directly to the destination. This feature is also expected to offload some of the traffic and traffic management load of the base station.

It is also important to note that the VC-UEs may communicate with the UEs in its local cell using a wireless interface provided on one or more unlicensed, shared licensed and/or licensed bands. Likewise, VC-UEs can backhaul traffic to the network in any suitable way, although it is generally expected that it would be carried out using one or more licensed bands, for example to providing the backhauling over a wireless interface with a higher interference control.

It is noteworthy that the VC-UE does not operate in the same manner as a terminal-to-base station relay node as currently discussed in the 3GPP consortium. In effect such a relay is for relaying messages the base station where the terminal is connected as an RRC layer with the base station, but not with the relay node. With a VC, the terminal is connected to the relay which therefore operates more like an anchor than like a relay (in view of the present definition and use of 3GPP relays). Returning to the example of FIG. 3, with a relay node the messages from UE1 to UE2 would go from UE1 to the relay, which would forward it to the base station and once it is returned by the base station for UE2, the relay node would forward it from the base station to UE2. As can be seen, this is also fundamentally different from a VC terminal which can enable a direct communication from UE1 to the VC-UE and the UE2, without having to send the message to the base station. The skilled reading is in particular directed to the EP application EP 15188002.8 which discusses terminal-to-terminal relays and which is incorporated herein by reference. In other words, a VC-UE as discussed herein operates in a very different manner to both a terminal-to-base station relay and a terminal-to-terminal relay. With this relatively new type of service, it is envisaged that VC UEs would thus manage certain aspects such as one or more of radio resource management, RRC connection control etc. rather than relying on the base station only. In other words, a VC UE is expected not only to relay data but also to organize its local network/cell from a radio/connection control perspective. It is hope that by including such VC UEs in the network, certain aspects can be improved, e.g. by offloading some of the signalling overhead or of the resources allocation functions from the base station or by improving the efficienty of radio resource allocation, amongst other things.

While the local cells are expected to assist the base station, they are also expected to be of a more transient nature than a base station, and even more so if they are provided by a terminal which may be mobile, run out of battery, etc. In other words, these local cells may assist the base station and network while they are in operation but they may also be activated and deactivated without notice which could leave the terminal out of a connection before a new connection is set up with the base station for the base station cell covering the local cell.

In the context of 3GPP, a terminal and a base station can be either not connection, in a RRC_IDLE state or in a RRC_CONNECTED state. Generally a terminal camping on a cell will be in RRC_IDLE and once it wants to send data to the base station, it will transition into the RRC_CONNECTED state. The base station will maintain RRC connection context information for all terminals in its cell that are communicating with/through it. According to the current 3GPP Technical Specification document 36.331 [2], the RRC_IDLE and RRC_CONNECTED states are defined as follows:

RRC_IDLE:
A UE specific DRX [Discontinuous Reception] may be configured by upper layers.
UE controlled mobility;
The UE:
  Monitors a Paging channel to detect incoming calls, system information change, for ETWS [Earthquake and Tsunami Warning System] capable UEs, ETWS notification, and for CMAS [Commercial Mobile Alert Service] capable UEs, CMAS notification;
  Performs neighbouring cell measurements and cell (re-)selection;
  Acquires system information.
  Performs logging of available measurements together with location and time for logged measurement configured UEs.

RRC_CONNECTED:
Transfer of unicast data to/from UE.
At lower layers, the UE may be configured with a UE specific DRX.
For UEs supporting CA [Carrier Aggregation], use of one or more SCells [Secondary Cells], aggregated with the PCell [Primary Cell], for increased bandwidth;
For UEs supporting DC [Dual Connectivity], use of one SCG [Secondary Cell Group], aggregated with the MCG [Master Cell Group], for increased bandwidth;
Network controlled mobility, i.e. handover and cell change order with optional network assistance (NACC [Network Assisted Cell Change]) to GERAN [GSM/EDGE Radio Access Network];
The UE:
  Monitors a Paging channel and/or System Information Block Type 1 contents to detect system information change, for ETWS capable UEs, ETWS notification, and for CMAS capable UEs, CMAS notification;
  Monitors control channels associated with the shared data channel to determine if data is scheduled for it;
  Provides channel quality and feedback information;
  Performs neighbouring cell measurements and measurement reporting;
  Acquires system information.

When using a local cell, we are faced with the problem of setting up the radio resource control connections with the mobile node providing the local cell (e.g. VC-UE) and with the base station providing the base station cell that the UE is camping on. In particular, if a terminal has to send data, because the data will be sent through both the mobile node and through the base station, they may both have to maintain a context for the communications with the terminal that is camping onto their respective cells. As the control/data paths are different from those used in a conventional mobile network arrangement (including one involving relay nodes), the conventional techniques and methods may not be adapted to this specific configuration.

Figure 4:
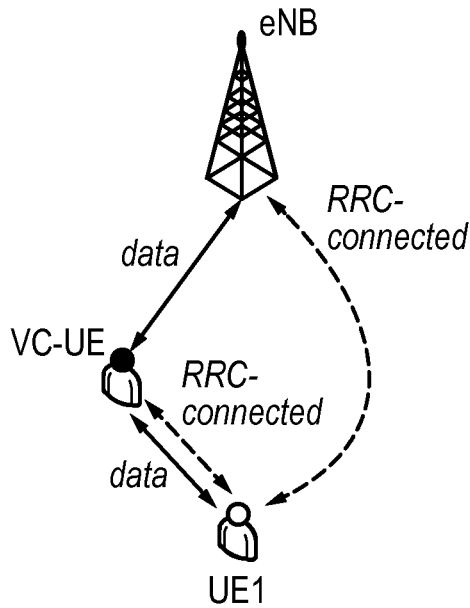
FIG. 4 schematically represents a possible control connection configuration in a local cell arrangement.

FIG. 4 schematically represents a possible control connection configuration in a local cell arrangement. In this example, the above problem can be addressed by having the terminal having a full RRC connection activated with the VC-UE (for using the local cell) and with the base station (in case the VC fails). The data would go through the VC-UE and, if it needs to be transmitted to the base station, then the VC-UE can forward it to the base station. In parallel, the terminal and base station maintain an RRC connection ("RRC_CONNECTED" state) so that the UE can use the base station if the local cell fails and so that the base station can be aware of the presence of the terminal. However, by having to maintain two full RRC connections, the load on the UEs and on the base station can be rather high and some of the benefits derived from having a local cell can be thereby reduced.

In accordance with the present disclosure, there can be provided an arrangement where a terminal can have a full or high radio resource control connection with the mobile node providing a local cell and a limited or low radio resource control connection with the base station. Accordingly, some of the functionalities of the base station can be transposed to a mobile node providing a local cell while the terminal maintains only a limited connection with the base station, thereby minimising the overhead while facilitating a return to a base station's coverage if the local cell fails. In a 3GGP environment, this could be implemented by having different levels of RRC connectivity with the mobile node and with the base station. The mobile node can monitor the status (e.g. connected, idle) of UEs and manage the RRC connection between them, e.g. in a manner similar to that used by a base station. The present disclosure also aims at addressing the questions of how functions can be split between the base station and the mobile node; how the mobile node can manage the connection with its UEs (e.g. to set up/maintain/release the RRC or RRC-like connections in a 3GPP environment), what kinds of context information can be to transferred between UEs and the mobile nodes, etc.

It is expected that with an arrangement as proposed herein, using a local cell with a full connection to the mobile node and a base station cell with a partial/limited control connection to the base station could assist with the following situations, in particular in a 3GPP environment (although the same teachings could be transposed to a different environment):

A RRC signalling overhead reduction between the base station and UE. In conventional network architectures, the eNB is responsible for maintaining the RRC connections with all UEs within coverage and the signalling overhead can be non-negligible in a UE-dense scenario. In accordance with the present disclosure, it can be attempted to reduce the signalling by selecting and activating one or more virtual cells within the base station cell and the virtual cells can manage the RRC connections with the UEs in these virtual cells. Accordingly, the base station no longer maintains full RRC connections with each and every UEs individually and can instead maintain a limited or partial RRC connection with the UEs.

An improvement of spectrum efficiency and interference mitigation by supporting resource allocation within the virtual cells. Comparing with an arrangement where resource allocation is managed by a single node (base station), a distributed resource allocation scheme using VC can provide more flexibility and robustness. For example, through coordination with virtual cells in the network, the eNB can have a better control on the interference mitigation and resource management across the entire base station cell, and can control resources allocated to the VC with a view to reducing inter-virtual cell interferences. Also owing to the (expected) lower transmission power of VCs, the same resources could be shared among different VCs to further improve the spectrum efficiency. As for the virtual cells, it is relatively straightforward to manage a smaller group of UEs (compared to the large of number of UEs that a base station is generally expected to manage), and it can do so with a relatively fine granularity of resources to allocate to UEs in its range. This can in turn be expected to reduce intra-virtual cell interferences (with a finer granularity in the resource allocation, the number of resource units that can be allocated is expected to increase such that the probability of users sharing the same resources will decrease). Accordingly, the mobile node can manage the resource allocation for the UEs in its local cell. The RRC connection can then also be managed by the mobile node to configure/re-configure the related physical control channels and data channels for example to receive resource allocation grants and data, respectively, as well as other configurations to support the resource allocation, such as Buffer Status Report (BSR) timers etc.

An improvement of service continuity by supporting mobility control (by the mobile node). Once a UE is connected to a virtual cell, its position can for example be tracked by the mobile node whether it is in a limited connectivity state (e.g. by paging to identify the UE's Tracking Area) or in a more complete connectivity state. Although, the base station may be able to track the UE using the virtual cell (together with its position), even in cases where the terminal is in a limited connectivity state with the base station (e.g. RRC_IDLE state). From the perspective of the terminal, in order to keep the service continuity, the terminal can support a fall-back to the network and/or handover to another virtual cell.

QoS differentiation. It is expected that, in future networks, QoS differentiation support will be an important aspect, both between users and between services for each individual user. With a radio resource control connection between the VC and the UE, the resource can be allocated by the mobile node for different QoS classes with a view improving QoS and/or quality as perceived by the user. The virtual cell can then manage the corresponding radio bearers with the UE (e.g. to establish/maintain/release them) for mapping the logical channel configuration with the services. Owing to the RRC connection between the virtual cell and the UE, such a resource allocation management can be provided, if appropriate.

An improvement of spectrum efficiency and service continuity by supporting measurement report transmission. With a view to improving the local resource allocation by the virtual cell, the virtual cell may be made aware of the quality between virtual cell and its scheduling UE. The UE may then measure the channel quality with the mobile node providing the virtual cell and report this to virtual cell if being triggered (events can be defined for example if the link quality is too low, relatively lower than with another mobile node providing another virtual cell, relatively lower than with the base station, etc.). Using the RRC connection between virtual cell and the UE, the measurements can be configured and transmitted to the virtual cell in a measurement report.

Accordingly, it is expected that with a radio resource control connection arrangement as discussed in the present disclosure, one or more benefits can be provided or unlocked, thereby assisting with an increased network efficiency.

Figure 5:
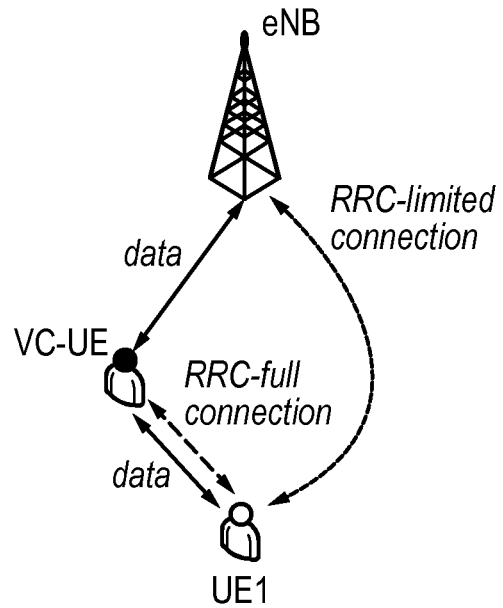
FIG. 5 schematically represents another possible control connection configuration in a local cell arrangement.

FIG. 5 schematically represents another possible control connection configuration in a local cell arrangement. As illustrated in FIG. 5, UE1 can have a full RRC (or RRC-like) connection with the VC-UE, wherein the VC-UE can operate as an anchor for data transmission and can allocate resources within its VC, and a limited RRC (or RRC-like) connection with the base station. In the interest of conciseness, the RRC or RRC-like connections with the mobile nodes providing a VC will hereinafter be referred to as "VC-RRC" while the RRC or RRC-like connections with the base stations will hereinafter be referred to as "RRC". This should not be understood as applying to the RRC as defined in the 3GPP only but is equally applicable to corresponding radio resource control connections providing at least the same or similar functionalities. Accordingly, the UE1 can send data via the VC-UE and, at the same time, some connection—but a limited connection—remains with the base station.

Figure 6:
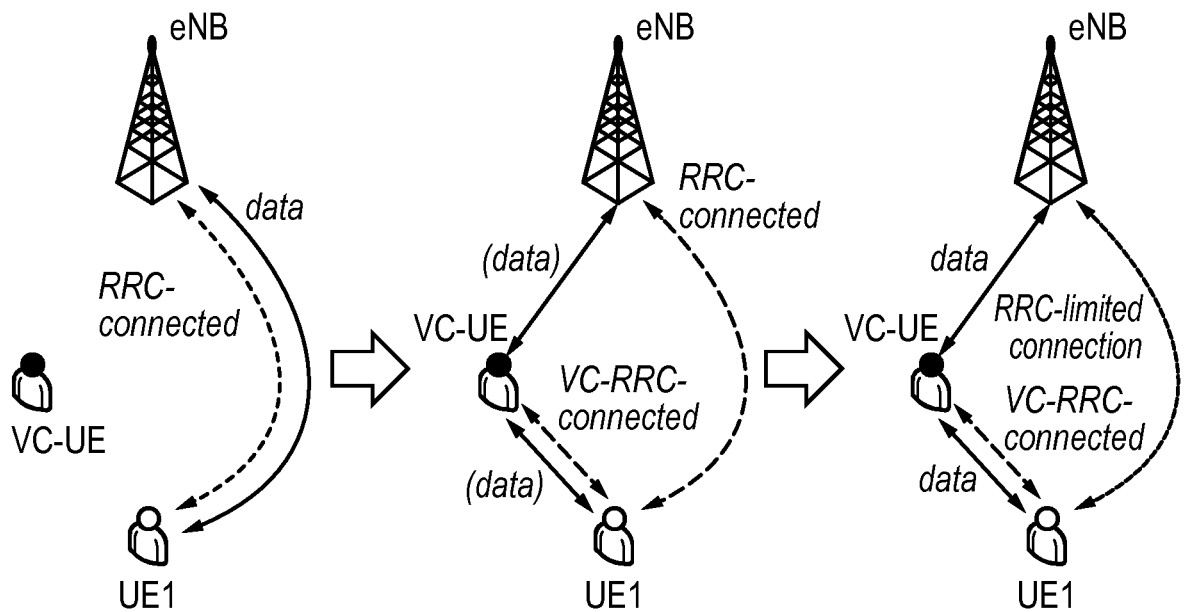
FIG. 6 schematically represents example of transitions from different states relative to a base station cell and a local cell.

Example transitions between different states with respect to the VC-UE and/or base station will now be discussed, with reference to FIGS. 6-8. FIG. 6 schematically represents example of transitions from different states relative to a base station cell and a local cell, wherein the terminal is originally only connected to the base station (full connection) and, at the end, is connected to both the VC-UE (full connection) and the base station (limited connection). First, the UE1 is only connected to the base station, in a conventional way, for transmitting messages to the base station. In particular, UE1 is in an RRC_CONNECTED state with the base station so that it can communicate with the base station over the radio interface. Then UE1 sets up a connection with a VC-UE so that the terminal can exchange data with the VC-UE over the wireless interface. The data can for example be transmitted, if appropriate, to the base station as illustrated in FIG. 6. Once the terminal has set up a full connection with the VC-UE, it can release the full RRC connection with the base station and transition to a partial or limited connection with the base station. In one example, the terminal transitions into a RRC_IDLE connection with the base station wherein the terminal remains connected to the base station but only with very limited functionalities available. The UE1 can then communicate using the local cell and VC-UE. It is noteworthy that, although in the example of FIG. 6, UE1 can start exchanging messages with the local cell as soon as it has a full RRC connection with the mobile node (e.g. regardless of when the connection with the base station is downgraded or before it is downgraded), in other examples the terminal may first set up the connections with the VC-UE and base station and starts sending data only once the radio resource control connection with the base station has been transitioned from full to partial.

Figure 7:
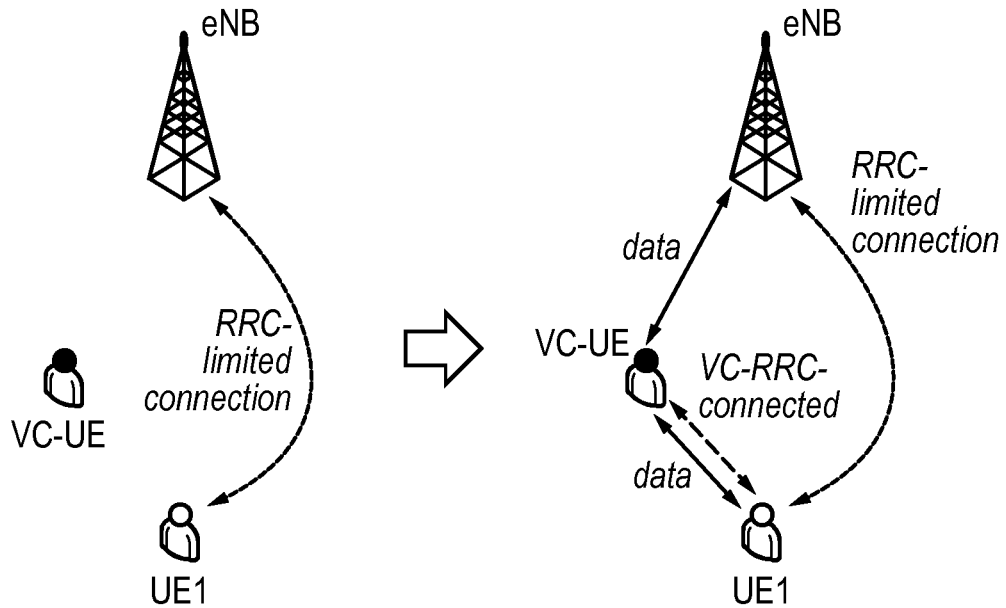
FIG. 7 schematically represents another example of transitions from different states relative to a base station cell and a local cell.

FIG. 7 schematically represents another example of transitions from different states relative to a base station cell and a local cell. In this example, the terminal is initially in a limited connection with the base station, for example in a RRC_IDLE state with the base station. In some other examples, the terminal may also be in a limited connection with the base station and thus have a limited radio resource control connection with both the mobile node for the local cell and the base station. Then UE1 transitioned to the full connected state with the mobile node (e.g. VC_RRC_CO-NNECTED state with the VC-UE) and keeps the limited RRC connection with the base station. Once UE1 is in a full connection mode with the VC-UE, it can then exchange messages with VC-UE over the wireless interface wherein at least of the messages and/or of their content may be transmitted by the VC-UE to the base station, if appropriate. In some examples, there may be an intermediate state where the terminal first transition into a limited connected state with the VC-UE (e.g. VC_RRC_IDLE state) and then transitions into the fully connected state while in other examples the UE1 may transition directly from a non-connected state with the VC-UE to a fully connected state.

Figure 8:
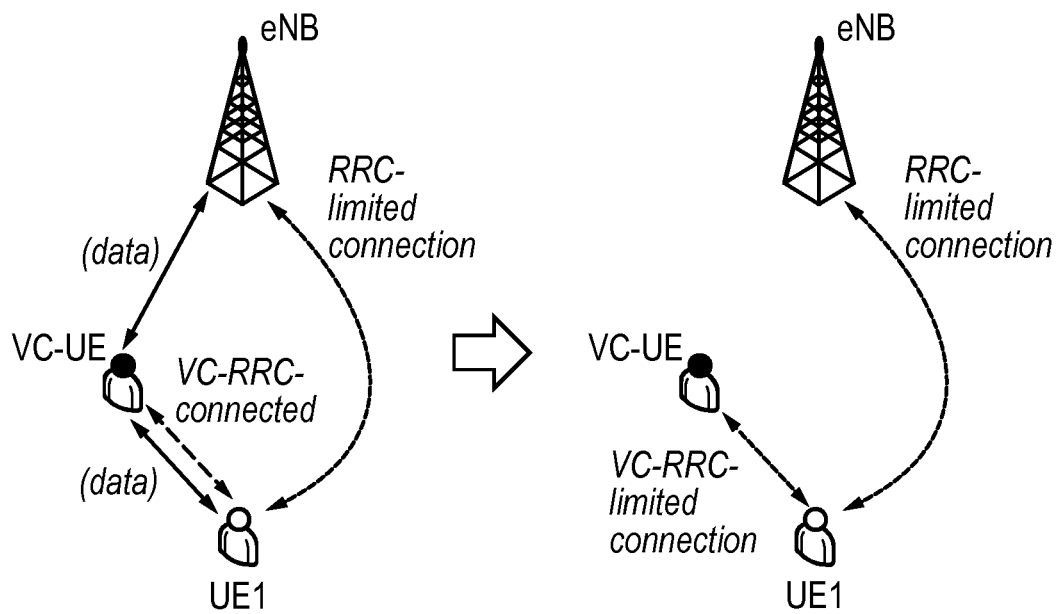
FIG. 8 schematically represents a further example of transitions from different states relative to a base station cell and a local cell.

FIG. 8 schematically represents yet another example of transitions from different states relative to a base station cell and a local cell in which the terminal is initially in a dual-connected mode with a full connection with the VC-UE and a partial connection with the base station. For example the UE1 may be communicating via the local cell rather than the base station cell with a RRC connection set up as proposed herein. Once the terminal has completed its communications and wishes to return to an idle mode, it can transition from the VC_RRC_CONNECTED state to the VC_RRC_IDLE state and, at the same time, remain in the RRC_IDLE state with the base station. If UE1 later wishes to communicate, it can do so by transitioning back to the VC_RRC_CONNECTED state for using the local cell and to RRC_CONNECTED for using the base station cell.

While the terminal is in a VC_RRC_CONNECTED state with a mobile node, a radio resource control context may be maintained at the mobile node for the terminal and for the duration of the (full) connection with the terminal. Such context information may for example include one or more of: information regarding the configuration of data and/or signalling radio bearers; information regarding a radio link control configuration and/or state; security information (e.g. encryption related information); measurement configuration; information regarding the terminal's identity (e.g. C-RNTI). On the other hand, when the terminal does not have a full RRC connection with the base station, the base station does not generally maintain such a context for the terminal. For example, as the terminal's identifier is generally allocated to the terminal for communicating with it (e.g. in RRC_CONNECTED mode), the base station does not expect to maintain a context for the terminal with its identifier when the terminal is in an idle state. In one example of the present disclosure, at least some of the radio resource control context at the mobile node and for the terminal is transmitted or notified to the base station. This can for example facilitates mobility from a VC to the cell or from a VC to another VC. In some examples, the entire context information may be forwarded to the base station for the base station to maintain it for the terminal in RRC_IDLE, although it would generally be expected that the information that is mostly of use to the mobile node, and not to the base station, would not be transmitted to the base station.

Accordingly, the base station may be configured to maintain a limited context for a terminal which is in a RRC_IDLE state (or any other possible example of limited RRC state with the base station) and in a VC_RRC_CONNECTED state with a local cell. In some examples the limited context comprises an identifier for the terminal, the identifier being used by the mobile node to communicate with the terminal and/or being allocated to the terminal for the duration of the VC_RRC_CONNECTED state.

Accordingly radio resource control states may be defined for the terminal to have a full connection with the local cell and a limited connection with the base station. It should be noted that, as used herein, a "full" connection or a terminal being "fully" connected with one of a mobile node or a base station refers to a radio resource control (e.g. RRC in 3GPP) state in which the terminal can exchange user data and signalling with the mobile node or base station. On the other hand, a limited connection refers to a radio resource control state in which the terminal remains connected to the mobile node or base station but cannot exchange user data with the mobile node or base station. For example, in a limited mode, the terminal may be configured to do one or more of: monitoring and receiving paging information, carrying out measurements, handling mobility (e.g. to another VC or base station cell), etc. In one example, the functionalities available in the VC_RRC_IDLE and VC_RRC_CONNECTED states are defined as follows:

VC_RRC_IDLE
Sleeping mode management for energy saving/DRX management
VC specific system information acquisition (if any)
measurements configuration from the VC
paging channel—if any—monitoring
VC_RRC_CONNECTED
Data transfer between UE and VC
Energy saving mode/DRX management
Mobility control, handover to another VC or fallback to network
paging channel—if any—monitoring
VC specific system information acquisition (if any)
Monitoring of the VC's specific control channel and data channel to send/receive data
Perform measurement if configured by the VC
Provide channel state information for the VC and feedback if necessary The terminal can for example be expected to first enter the VC_RRC_IDLE state either when the UE has received a virtual cell notification message or when the UE receives a notification from the base station and then accesses the virtual cell. Such a notification can for example include the virtual cell ID for the local cell and, optionally, the type of communication (e.g. the communication accepted by the VC UE) and/or any other type of information that can be useful for the terminal to join the local cell (e.g. mobility of the VC-UE information).

When the terminal is at least camping on the VC—or in a fully connected state with the mobile node—the base station may be made aware of it so that it can know how to reach the terminal. For example, the base station can then reach the terminal (e.g. for paging) via the VC or may be configured to determine whether to reach the terminal via the VC or via its own cell and proceed accordingly. For example, the mobile node may notify the base station of the terminal(s) that are in a VC_limited and/or VC_full state for its VC. Additionally or alternatively, the terminals themselves may be configured to notify the base station that it is connected to a VC. In cases where the terminal would have to transition to a connected state (with the base station or mobile node) to send such a notification, it may be preferable for the mobile node to notify the base station because the mobile node is more likely to already have a full connection with the base station. In other cases the terminal may be configured to re-use existing communication patterns to notify the base station, e.g. to send the notification alongside measurement reports it may already be configured to send to the base station.

Examples of message exchanges for managing the VC_RRC states are further discuss below with reference to FIGS. 9-13. While the examples have been provided in a 3GPP context and may thus have some similarities with existing RRC messages with a view to minimising the changes to existing techniques and mechanisms already in place (which can simplify the implementation of the techniques discussed herein), other messages may be used for setting a full or limited VC connection and thus for activating or transitioning into the corresponding full or limited radio connection states with the mobile node. In some cases, the message exchange may be different and/or the content of the messages may differ.

Figure 9:
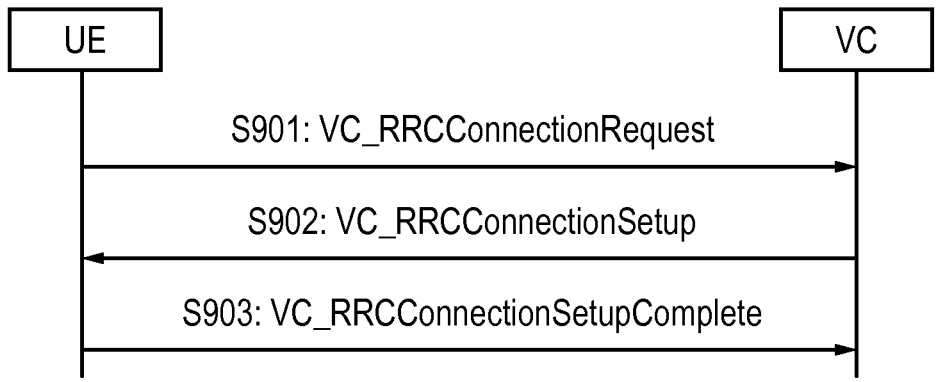
FIG. 9 represents an example call flow for setting up a control connection with a local cell.

FIG. 9 represents an example call flow for setting up a control connection with a local cell. The call flow of FIG. 9 starts with the UE being in a VC_RRC_IDLE (limited connection) state and transitioning into a VC_RRC_CONNECTED (full connection) state. Three messages are exchange in succession: first S901 for the terminal requesting a radio resource control connection with the mobile node (providing the VC), then at S902 a response from the mobile node that the request has been accepted and at S903, the terminal indicates that the connection setup has been completed. Example messages and content included in these messages are discussed below.

S901 VC_RRC Connection Request
The UE may be configured to use default configurations, e.g. regarding the physical channel configuration, MAC configuration, etc. to communicate with the mobile node when in VC_RRC_IDLE state. Then the VC-UE RRC connection establishment can be initiated with a VC_RRCConnectionRequest message from UE to the mobile node. This message can for example be carried on VC_SRB0, a VC Signalling Radio Bearer (SRB) which can be provided for use for RRC messages using a common control logical channel available for all the UEs in the virtual/local cell. For example a VC_SRB may be provided in a similar manner to the existing SRB provided by the base station in similar circumstances. The content of the message can for example include the following fields or information:
(1) UE-identity: e.g. a s-TMSI (for the RACH procedure to access the virtual cell if any), or a C-RNTI if UE has already been allocated one (e.g. if the UE is in a RRC_CONNECTED state, the base station would be expected to have already allocated a C-RNTI to the terminal) or a random value.
(2) EstablishementCause: e.g. to indicate that the connection establishment is for a VC_RRC connection with the local cell.
S902 VC_RRC Connection Setup
If the mobile allows the VC_RRC connection to be set up in full, a VC_RRCConnectionSetup message may then be sent from mobile node to the UE. For example, this message can be carried out on a VC_SRB0. In some examples, the message may in particular contain VC_SRB1 establishment information, where the VC_SRB1 is for the next RRC message (confirming the completion of the connection setup) using a dedicated control logical channel for the UE in the virtual cell. The content of the message can for example include the following fields or information:
(1) Virtual cell ID, for example a C-RNTI for the mobile node or any other identifier for uniquely identifying the mobile node. The identifier can for example be allocated by the base station which can select the identifier with a view to identifying the VC/mobile node uniquely within the cell and potentially with a view to avoiding conflict with local cell in neighbouring base station cells (in cases where the base station has been provided or can access this type of information).
(2) RRC transaction ID, an identifier for the RRC procedure.
(3) VC_SRB1 information. For example the information may include a VC_SRB1 identifier (of value 1), RLC configuration information for the local cell if appropriate, and/or logical channel configuration information for indicating that the VC_SRB1 configuration should be used (e.g. a in a manner that is similar to that used for SRB1 in conventional networks—see for example 36.331 [2]).
(4) MAC configuration information for the local cell, if appropriate.
(5) Semi-Persistent Scheduling (SPS) configuration information, if appropriate.
(6) Physical channel configuration information for the local cell, if appropriate (e.g. Pcell information as well as Scell information if carrier aggregation is supported where the Scell may be on an on unlicensed spectrum or shared spectrum if supported).
(7) Configuration information for a VC-UE radio link failure monitoring timer, if appropriate.
(8) Mobility state for the mobile node, if supported by virtual cell. The mobile node can for example indicate how mobile it is or can be which can be helpful for the terminal to estimate the robustness of the VC-UE link. For example, if the mobile has a high mobility and the terminal is also expected to be very mobile and/or if the link between the two is already not very strong, the terminal may decide the VC-UE link is likely to be difficult to maintain in a stable condition for a worthwhile duration and may decide not to complete to connection with the mobile node. In some examples, the mobility state could be indicated its mobility as high, medium or low or as a value selected from a range.

S903 VC_RRC Connection Setup Complete
Once the terminal receives the VC_RRCConnectionSetup message, it can transition into the VC_RRC_CONNECTED state (unless for example it decides not to go through with the connection of the mobile is expected to be too mobile for the terminal). Once the terminal is in VC_RRC_CONNECTED, it can send a VC_RRCConnectionSetupComplete message to the mobile node to indicate that the RRC connection has been successfully established (in a full mode). This message may for example be carried on a radio bearer of VC_SRB1. The content of the message can for example include the following fields or information:
(1) A Virtual cell ID, to indicate the target of the RRC message.
(2) RRC transaction ID, as previously indicated during the RRC procedure.
(3) DedicatedInfoNAS comprising NAS information from the terminal that will transit to the base station via the local cell, for the terminal to establish a NAS connection (e.g. with a Mobility Management Entity "MME" in the core network)—or an equivalent message for setting up a connection with a mobility manager beyond the base station.
(4) Mobility state for the UE: as for the mobility state of the mobile node, this can be helpful for the mobile node to estimate the robustness of the VC-UE link. In some examples, the mobility state could for example be indicated as e.g. high, medium or low or as a value selected from a range.

If the terminal fails to establish the full radio connection with the local cell, then terminal may then fall back to attempting to establish a full radio connection with the base station cell so that it can communicate data with the base station directly rather than via a mobile node/local cell. It is noteworthy that this fall-back may be attempted regardless of the reason for the failure (e.g. whether the mobile node rejected the connection, the terminal rejected it for example due to the mobile node's mobility, etc.). In some examples, the base station connection attempt may at least in part be based on the reason for the VC_RRC connection failure. For example, the terminal may report to the base station that it has previously attempted a VC connection—e.g. indicating the corresponding mobile node's ID—and the reason why this has not been successful. This information could be helpful for the network to assess how successful the VC_RRC connections are and/or to monitor the success rate and failure reasons for a specific mobile node. This information can assist in improving the network configuration. In other examples, the procedure for setting up the RRC connection with the base station can remain the same whether the terminal is attempting a full RRC connection in a conventional manner or whether the terminal is attempting a full RRC connection as a fall-back following an unsuccessful full VC_RRC connection with the mobile node.

Figure 10:
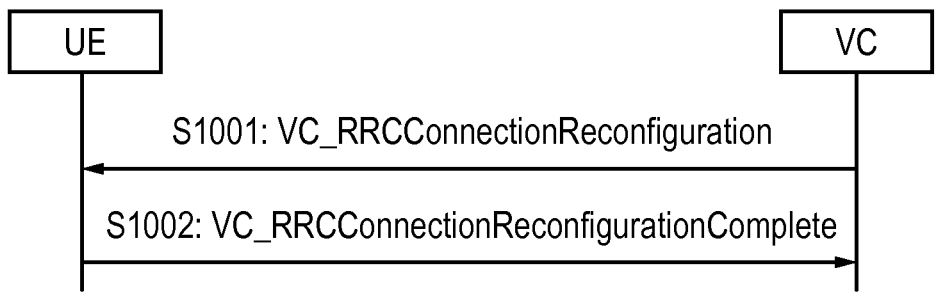
FIG. 10 represents an example call flow for reconfiguring a control connection with a local cell.

FIG. 10 represents an example call flow for reconfiguring a control connection with a local cell. This procedure may be used to modify an existing (full) VC_RRC connection. While the equivalent RRC procedure can be complex, this VC_RRC reconfiguration is expected to be less complex. In particular, it is expected that, in many cases, the VC may provide fewer functionalities than a conventional base station cell such that the VC radio control connection would then control fewer features and, as a result, the reconfiguration would be less complex. For a local cell, this procedure is expected to be used for one or more of establishing, modifying and/or releasing one or more radio bearers (e.g. VC_SRB1, VC_DRBs) previously configured for the full radio connection between the UE and the mobile node; setting up, modifying and/or deleting measurement configurations; for performing a handover if necessary (e.g. to activate one of a fall-back to network or a handover to another virtual cell).

S1001 VC_RRC Connection Reconfiguration
This VC_RRCConnectionReconfiguration message is sent from the mobile node to the UE, e.g. on the radio bearer for VC_SRB1. The message may be used to convey some (re)configuration information e.g. DRB configuration, measurement configuration, radio resource configuration for modification, or certain NAS information if any. The content of the message can for example include the following fields or information:
(1) Virtual cell/mobile node ID.
(2) RRC transaction ID, as the identifier for the RRC procedure.
(3) Measurement configuration, to indicate the measurement(s) that the terminal is instructed to conduct. More specifically, the measurement configuration can refer to a link quality measurement between the UE and the mobile nodeNC and/or to a link quality measurement between the UE and the serving or a neighbour cell (or more neighbour cells) and/or to a link quality measurement between the UE and one or more neighbour local cells.
(4) DedicatedInfoNAS list, NAS message list to be transmitted via the virtual cell.
(5) VC_DRB add/modify/release list, to (re) configure the DRB between the mobile node and the terminal. For example this information can include any one or more of: an EPS bearer ID, a VC_DRB ID, a VC PDCP configuration, a VC RLC configuration, a VC-specific logical channel ID and configuration and a DRB type (e.g. split or not split)
(6) VC MAC configuration information if appropriate.
(7) SPS configuration information if appropriate.
(8) VC physical channel configuration information if appropriate (e.g. Pcell and Scell if carrier aggregation is supported, with the Scell on unlicensed spectrum or shared spectrum if supported).
(9) VC-specific system information if appropriate
(10) Sidelink configuration information for the VC-UE link if supported. For example this information may relate to one or more of a synchronization signalling configuration, a discovery and communication resource pool configuration, synchronisation to the mobile node/local cell or to the base station/cell.
(11) An indicator regarding whether to simultaneously receive/transmit to the base station or not, for example if the two modes are supported. For example, in a first mode the terminal only fully connects to VC for data transmission while in a second mode, the terminal can connect fully to both the local cell and the cell and simultaneously exchange data with the mobile node and with the base station, in uplink and/or downlink.

S1002 VC_RRCConnectionReconfigurationComplete
This message is for the terminal to confirm that the reconfiguration has been successful. The message can for example include a RRC transaction ID if provided and an indicator that the reconfiguration has been successful.

Figure 11:
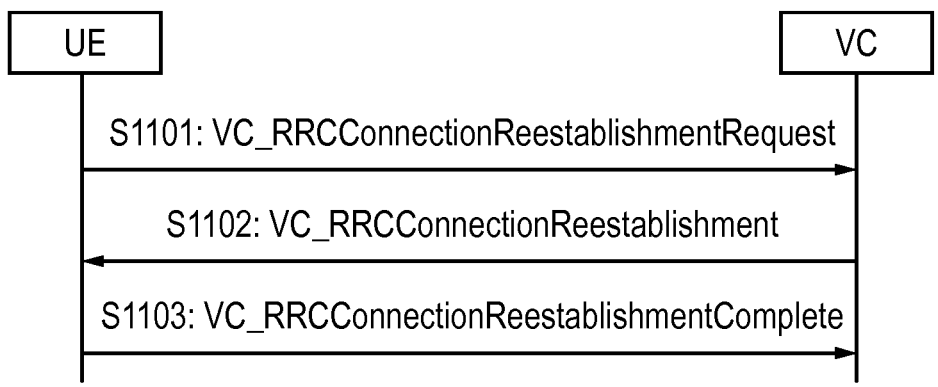
FIG. 11 represents an example call flow for re-establishing a control connection with a local cell.

In a case where the terminal wishes to re-establish the VC_RRC connection to a full level/grade, it can try a connection VC_RRC connection re-establishment procedure. This procedure may be used to re-establish the previously setup RRC connection, including for example the resumption of VC_SRB1 (if possible) and additional radio configuration of the local cell if necessary or appropriate. In some examples, this occurs when the UE detects a UE-mobile node radio link failure, a handover failure (e.g. if the terminal attempted a handover to another local cell), a VC_RRC connection reconfiguration failure, etc. and the terminal can then initiate a VC-UE RRC connection re-establishment procedure. The entire RRC connection re-establishment may include two phases if necessary. First the UE can try to re-establish the VC_RRC connection with the mobile node and, if successful, the UE will remain in the VC_RRC_CONNECTED state. On the other hand, if the re-establishment fails, the UE can then try to re-establish or establish (e.g. if the UE was in a RRC_IDLE state with the base station) a full radio connection with the base station. It is noteworthy that, while in most of the example when the terminal is in a partially/limited connected state with the base station, it can be in the RRC_IDLE state, in other examples the terminal may be in a different state, for example a newly defined RRC_PARTIAL state, with the base station, or in any other suitable limited radio connection state with the base station. In this case, whether the terminal will carry out a connection establishment or re-establishment procedure will depend on the terminology and conventions used for the state transitions and in particular used for a transition from a limited connection with the base station to a full connection to the base station. If this is successful, then the terminal will be in a full radio connection state with the base station (e.g. RRC_CONNECTED state) or else, if it has failed, it will be in a limited radio connection state with the base station (e.g. RRC_IDLE state). The procedure is illustrated with reference to FIGS. 11 and 12. FIG. 11 represents an example call flow for re-establishing a control connection with a local cell.

S1101 VC_RRCConnectionReestablishmentRequest
The terminal can send a VC_RRCConnectionReestablishment message to the mobile node, e.g. on the radio bearer VC_SRB0. It will include the contents as follows. The content of the message can for example include the following fields or information:
(1) UE-identity: for example a C-RNTI for the terminal if it has already been allocated one, or the random value selected in the VC_RRC connection establishment.
(2) A re-establishment cause
(3) The virtual cell ID.
(4) A RRC transaction ID, as the identifier for this RRC procedure.

S1102: VC_RRCConnectionReestablishment
In the event that the mobile accepts the VC_RRC connection re-establishment request from the terminal, the mobile node responds with a positive VC_RRCConnectionReestablishment answer. This message can include a variety of information and, for example, the type and content of information that can be included can for example be derivable from the type/content of information present in the VC_RRC connection establishment request and/or from the corresponding RRC Connection re-establishment messages. In one example, this message is sent on the radio bearer VC_SRB0. The VC_SRB1 will be re-established with this message. The content of the message can for example include the following fields or information:
(1) The virtual cell ID.
(2) The RRC transaction ID (see (4) above).
(3) VC_SRB1 information: a VC_SRB1 identifier (e.g. 1), VC RLC configuration information if appropriate, Logical channel configuration information (e.g. indicating that the VC_SRB1 configuration should be used, in a manner similar to the SRB1 configuration—see for example [2] section 9.2.1.1)
(4) VC MAC configuration information if appropriate
(5) SPS configuration information if appropriate
(6) VC physical channel configuration information if appropriate (Pcell and Scell information if carrier aggregation is supported, Scell on unlicensed spectrum or shared spectrum if supported.)

(7) Configuration information for a VC-UE radio link failure monitoring timer, if appropriate.

(8) Mobility state for the mobile node, if supported by virtual cell. The mobile node can for example indicate how mobile it is or can be which can be helpful for the terminal to estimate the robustness of the VC-UE link—see for example the discussion of S902 above.

S1103: VC_RRCConnectionReestablishmentComplete

The terminal can then confirm to the mobile node that the VC_RRC connection re-establishment procedure has been completed with a message like a VC_RRC-ConnectionReestablishmentComplete message. As for the message sent at S1102, this message can include a variety of information and, for example, the type and content of information that can be included can for example be derivable from the type/content of information present in the VC_RRC connection establishment request and/or response, and/or from the corresponding RRC Connection re-establishment messages.

Figure 12:
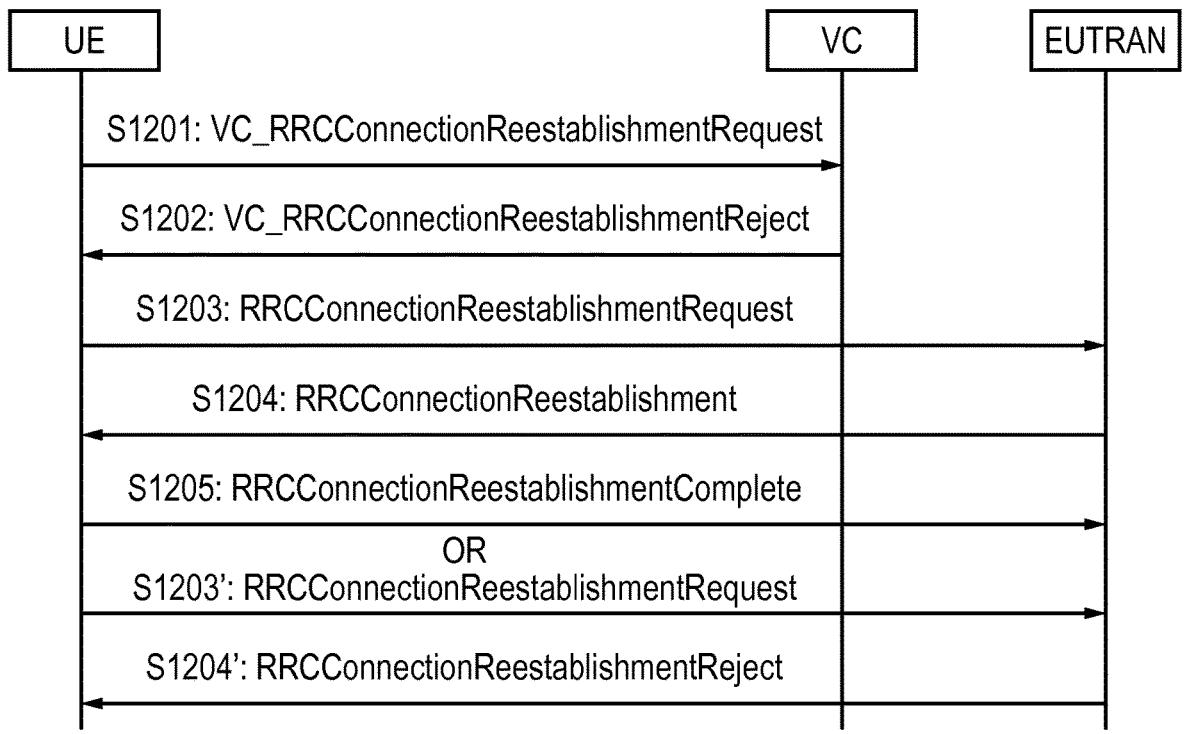
FIG. 12 represents an example call flow for re-establishing a control connection with a local cell with a fall-back on a base station call.

In the example of FIG. 11, the connection re-establishment with the mobile node has been successful, but in other cases the connection can be unsuccessful, for example, the mobile node can reject the VC_RRC connection re-establishment request from the terminal, as illustrated in FIG. 12. In particular, FIG. 12 represents an example call flow for re-establishing a control connection with a local cell with a fall-back on a base station call.

S1201: VC_RRCConnectionReestablishmentRequest

This message is similar to that sent at S1101 such that its discussion will not be repeated again.

S1202: VC_RRCConnectionReestablishmentReject

In this case, the mobile node rejects the VC_RRC connection re-establishment in response to the connection re-establishment request. This message can for example include information identifying that it is for the terminal and/or in response to the message received at S1201, and may also include information identifying a rejection (connection re-establishment failure) cause if appropriate.

Once the terminal receives this message, it determines that the connection re-establishment with the mobile node has failed and it can attempt to fall-back to the base station cell with messages S1203 (and S1203' discussed bellow).

S1203: RRCConnectionReestablishmentRequest

For this message, the conventional RRC connection re-establishment procedure can be followed, or any other equivalent radio control connection re-establishment procedure can be implemented. The terminal may for example indicate that it is attempting to re-connect to the base station following a failure of a local cell radio control connection. In some examples, the base station may also maintain some context information for the VC_RRC connections of the terminals in its cell such that the base station may be able to identify which VC radio full connection is being re-established and the mobile node that was previously connected in full mode with the terminal. This message may include a variety of information, in addition to the convention information that can be included in these message and the terminal may for example include an identifier for the VC_RRC full connection that has failed, an identifier for the mobile, a cause for the connection failure, etc. if appropriate.

S1204: RRCConnectionReestablishment

In this first example, the connection with the base station is successful and the base station responds with a positive answer to the connection request. This can for example be similar and/or adapted from the existing radio control (e.g. RRC) messages exchanged with the base station in a conventional arrangement.

S1205: RRCConnectionReestablishmentComplete

Likewise, as the RRC connection procedure involves an exchange of three messages, the RRC connection re-establishment procedure for a fall-back to the base station cell can involve a three message exchange as well with a connection re-establishment. The exchange may terminate upon the transmission of a confirmation of the completion of the connection re-establishment completion from the terminal. In particular, once the terminal has received the confirmation from the base station that the connection is being re-established, it can change to the RRC_CONNECTED state and send the completion confirmation to the base station.

S1203': RRCConnectionReestablishmentRequest

Alternatively, another call-flow for the exchange with the base station can result in a different outcome. Message S1203 is for the terminal to attempt to fall-back to the base station and the same teachings as discussed in respect of S1203 can be applied to this message.

S1204': RRCConnectionReestablishmentReject

In this case, and contrary to what happens in the S1203-S1205 call flow, the base station rejects the connection re-establishment request receives from the terminal. The base station can for example include a cause for refusing to allow to connection in its rejection message and/or provide the terminal with any suitable information. In this case the terminal is generally expected to remain in the RRC_IDLE state It is also noteworthy that, in some of the above examples, it has been assumed that the terminal was previously in the RRC_IDLE state (limited radio control connection with the base station) but the same teachings are equally applicable in cases where the terminal is already in a RRC_CONNECTED state (full radio control connection with the base station). In such a case, the terminal may for example not attempt a fall-back procedure with the base station cell if the connection with the local cell fails, as the terminal is already connected with the base station. The terminal and/or the mobile node may in some examples (e.g. when the base maintains a record and/or context of the current VC connection—or at least of the VC full connection) notify the base station that the connection previously established has now failed.

Additionally, while the discussion of FIG. 12 mentions a connection re-establishment request from the terminal with the base station, the skilled person will understand that from a different perspective, the procedure can be viewed as a connection establishment procedure with the base station in cases where the terminal was in a limited connection with the mobile node. The main elements to be considered in this fall-back case is that the terminal can try to ensure that it has at least a full radio resources control connection with the base station and, if the system operates in a mode where the base station maintains or is notified of information regarding the local cell connection information for the terminal, the base station may be notified one way or another that the terminal is no longer connected to the mobile node and may be trying to send its user data to the base station as a result.

Figure 13:
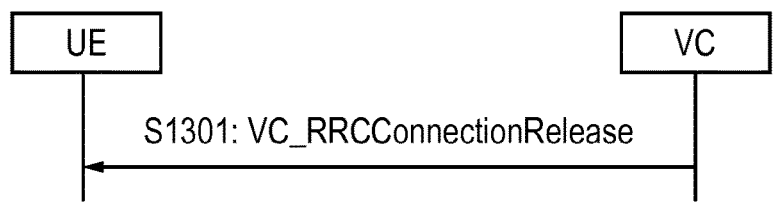
FIG. 13 represents an example call flow for releasing a control connection with a local cell.

FIG. 13 represents an example call flow for releasing a control connection with a local cell. This procedure can be used for the mobile node to release the radio control connection between the terminal and the mobile node. It can for example involve the release of the previously established radio bearers (e.g. VC_SRB1 and VC_DRBs) and/or the radio resources in accordance with the radio resource control procedures and techniques in use. After the release procedure, the UE can transition into the VC limited radio control connection (e.g. VC_RRC_IDLE) state. As illustrated in FIG. 13, the mobile node can send a VC_RRCConnection-Release message to the terminal, e.g. on the radio bearer VC_SRB1 previously established for the VC_RRC connection.

S1301: VC_RRCConnectionRelease
  The content of the message can for example include the following fields or information:
  (1) A virtual cell ID.
  (2) A RRC transaction ID, an identifier for the RRC procedure.
  (3) Release cause: this field can for example be provided or extended to indicate different release reasons. In some examples, this may affect what the terminal will decide to do next. For example the terminal may decide to handover to another local cell, to fall-back to the base station cell or take any other action deemed suitable in the circumstances based on the release cause.
  (4) Redirected Carrier Information: this information may for example be used to indicate the carrier frequency information for the cell selection as well as the corresponding system information of the cell.
  (5) Idle mode mobility control information: this information may for example be for providing or be useful for determining (local and/or base station) cell reselection priorities, e.g. in the format of frequency priority list.

In some examples, the terminal may reply to the message sent at S1301, e.g. to confirm receipt, while in other examples the procedure may terminate at this message and the terminal may not be expected to respond.

Various procedures have been described above and the skilled person will understand that the teachings provided herein, generally in the context of existing RRC procedures or of RRC-like procedures, can be equally applied to other radio control procedures, states and state transitions as appropriate.

Figure 14:
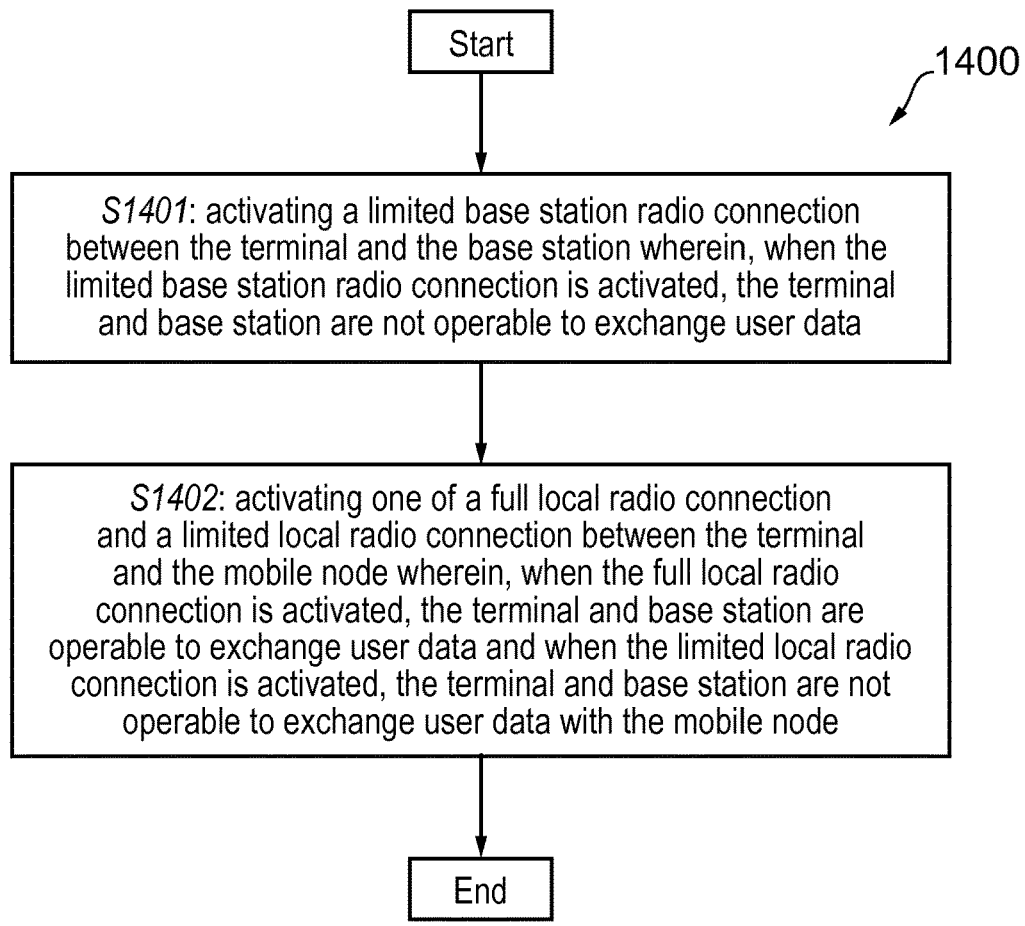
FIG. 14 illustrates an example method for use in a mobile telecommunications network or system.

FIG. 14 illustrates an example method for use in a mobile telecommunications network or system. The mobile telecommunications network or system comprises a base station providing wireless connectivity within a base station cell, a mobile node providing wireless connectivity within a local cell and configured to communicate with the base station as well as a terminal configured to communicate wirelessly with either or both the base station the mobile node. The method starts and at S1401 a limited base station radio connection between the terminal and the base station is activated. Generally, when this limited base station radio connection is activated, the terminal and base station are not operable to exchange user data such that, while they are connected to each other, they are limited to some signalling or control communications and are not configured to communicate user data such as application data. The method also comprises step S1402 wherein one of a full local radio connection and a limited local radio connection between the terminal and the mobile node is activated. When the full local radio connection is activated, the terminal and base station can exchange user data and when the limited local radio connection is activated, the terminal and base station cannot exchange user data with the mobile node.

Accordingly, and according to the teachings of the present invention, a terminal can be in a limited connection with the base station while it can be in a limited or full connection with a mobile node. In such an arrangement, the terminal can be primarily served by the local cell while a fall-back to the base station cell, if appropriate, can be efficiently carried out. On the other hand, the signalling overhead and load on the base station can be reduced compared to a case where the terminal is in a full connection with the base station. It is noteworthy that the terminal is also not in a full connection with the base station while it is effectively still being served by the base station—via the mobile node—when it is exchanging user or application data.

In some examples, the limited connected mode or state that is activated with the base station while the terminal is connected (in full or limited mode) with a VC-UE can be based on the RRC_IDLE or RRC_CONNECTED mode where some functionalities have been de-activated. For example, if based on the RRC_IDLE mode, the terminal may be configure to carry out: paging, system information acquisition and UE controlled mobility but not the following RRC functionalities: A UE specific DRX may be configured by upper layers, The UE performs neighbouring cell measurements and cell (re-)selection based on configuration information from the base station (for example the UE may not receive measurement configuration from the base station in cases where the UE already receives measurement configuration from the local/virtual cell); and the UE performs logging of available measurements together with location and time for logged measurement configured UEs. And in the RRC_IDLE mode, the terminal is not able to communicate data with the base station and this remains the case in the limited state derived from the RRC_IDLE state.

In another example, if based on the RRC_CONNECTED state, the following functionalities may be maintained: (i) C-RNTI will be recorded; (ii) Radio bearer between UE and eNB is remained; (iii) Network controlled mobility and (iv) Acquire system information. On the other hand, the following functionalities may not be maintained: (i) Transfer of unicast data to/from UE; (ii) At lower layers, the UE may be configured with a UE specific DRX; (iii) The UE: monitors control channels associated with the shared data channel to determine if data is scheduled for it; provides channel quality and feedback information; and performs neighbouring cell measurements and measurement reporting based on configuration information from the base station (likewise, if this type of functionality is already configured by the VC, the UE may not have to have it configured by the base station as well).

Figure 15:
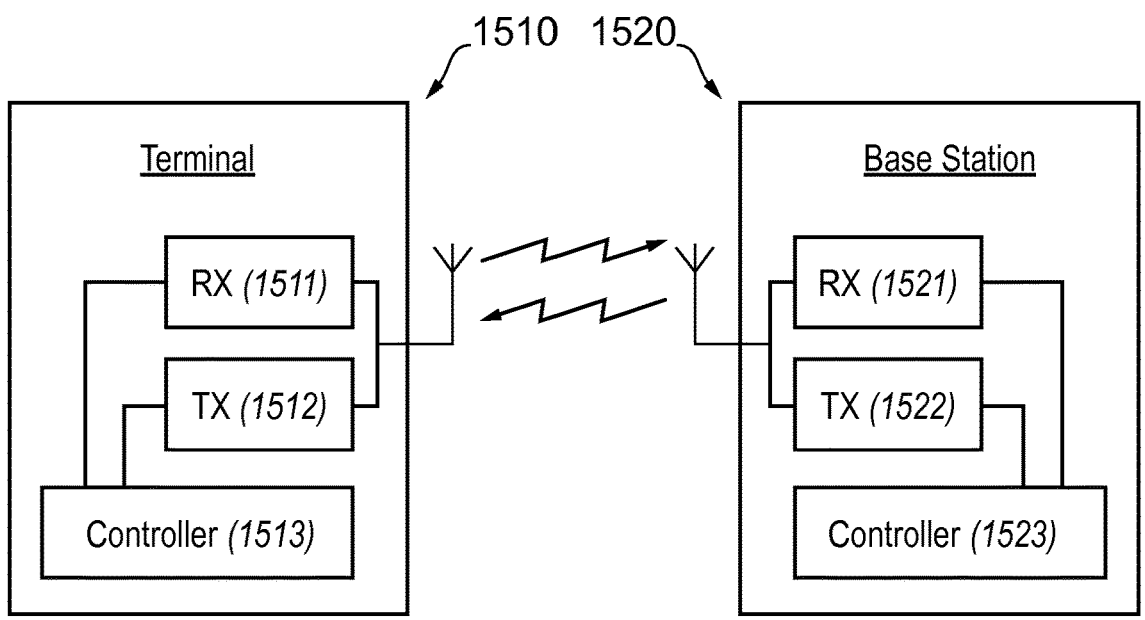
FIG. 15 illustrates an example terminal and an example base station in a telecommunications system.

FIG. 15 illustrates an example terminal (1510) and an example base station (1520) configured to communicate with each other and which may implement one or more techniques as discussed herein. The terminal 1510 comprises a receiver 1511 and a transmitter 1512 connected to an antenna for communicating via a wireless interface. The terminal also comprises a controller 1513 for controlling at least the receiver and transmitter of the terminal 1510. In some examples, the terminal may be configured such that the controller, receiver and transmitter may be configured to operate together to operate as a mobile node to provide a local cell to neighbouring terminals. Likewise, the base station 1520 comprises a receiver 1521 and a transmitter 1522 connected to an antenna for communicating via a wireless interface. The base station 1520 also comprises a controller 1523 for controlling at least the receiver and transmitter of the base station 1520. The base station and terminal can communicate over the air, via the wireless interface by transmitting uplink signals from the terminal to the base station and downlink signals from the base station to the terminal. A mobile node in accordance with the present disclosure may also have the same structure as the terminal and/or base station. Although it is generally expected that terminals will be providing local cell functionality, any other suitable node may be providing this functionality.

While FIG. 15 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 15 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

Generally, in the present disclosure, the prefix RRC has been used for states and connections with the base station and the prefix VC_RRC for states and connections with the mobile node for the local cell. It is noteworthy that these have been used in the interest of conciseness and that, unless they are being used specifically in the context RRC only, they are not limited to connections or states of the 3GPP (or equivalent) RRC protocol and are also intended to refer to any other radio resources control protocol.

Also, the radio resources control protocol, procedure, states or connections can also be referred to herein as radio, radio control or radio resources protocol, procedure, states or connections, respectively.

As used herein, the term mobile node is used to refer to the node providing the local/virtual cell and the mobile node functionality may be provided by a terminal, a relay node, a base station, a dedicated node, or any other suitable node.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. For example, in the method of FIGS. 15, S1501 and S1502 may be carried out in any suitable order, such as one after the other or at least partially in parallel. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a terminal, a mobile node, a base station or any other mobile node may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method for use in a mobile telecommunications network, the mobile telecommunications network comprising a base station providing wireless connectivity within a base station cell, a mobile node providing wireless connectivity within a local cell and configured to communicate with the base station and a terminal configured to communicate wirelessly with the base station and configured to communicate wirelessly with the mobile node; the method comprising: activating a limited base station radio connection between the terminal and the base station; and activating one of a full local radio connection and a limited local radio connection between the terminal and the mobile node.

Clause 2. The method of clause 1 wherein,
when the limited base station radio connection is activated, the terminal and base station are not operable to exchange user data; and/or
when the full local radio connection is activated, the terminal and mobile node are operable to exchange user data; and/or
when the limited local radio connection is activated, the terminal and mobile node are not operable to exchange user data Clause 3. The method of any preceding clause further comprising activating the full local radio connection and activating a full mobile node radio connection between the mobile node and the base station.

Clause 4. The method of any preceding clause further comprising,
activating the full local radio connection and
the terminal exchanging user data with the mobile node while the limited base station radio connection is activated and while the full local radio connection is activated.

Clause 5. The method of any preceding clause wherein the mobile node is one of a terminal, a relay node, a device-to-device relay node, a dedicated local cell mobile node.

Clause 6. The method of any preceding clause wherein, upon activation of the full base station radio connection, the terminal is allocated a radio identifier and wherein activating one of the full local radio connection and the limited local radio connection comprises the terminal notifying the mobile node of the radio identifier allocated upon activation of the full base station radio connection.

Clause 7. The method of any preceding clause wherein, when the limited base station radio connection between the terminal and the base station is activated, the terminal is in a RRC state and, optionally, in a RRC_IDLE state.

Clause 8. The method of any preceding clause wherein the terminal is configured to, when the limited base station radio connection is activated, carry out at least one of: monitoring of paging messages from the base station; acquiring system information transmitted by the base station; controlling the terminal's mobility; maintaining an identifier for the terminal in the base station cell; maintaining radio bearer with the base station; and carrying out mobility instructions received from the base station.
wherein, optionally, the identifier for the terminal in the base station cell is a C-RNTI identifier.

Clause 9. The method of any preceding clause wherein the terminal is configured not to carry out, when the limited base station radio connection is activated, any one or more of: applying DRX control based on a DRX configuration from the base station, performing neighbouring cell measurements based on measurement configuration information from the base station; performing cell selection and/or reselection based on cell selection configuration information from the base station; monitoring of control channels for scheduling assignments from the base station; measurement reporting based on measurement reporting information from the base station; reporting on a channel quality measurement for a user data transmission channel with the base station; and performing logging of measurements.

Clause 10. The method of any preceding clause wherein the terminal is configured to, when the full local radio connection is activated, carry out at any one or more of: data transfer to or from the mobile node; acquiring system information transmitted by the mobile node; reporting on a channel quality measurement for a user data transmission channel with the mobile node and carrying out mobility instructions received from the mobile node.

Clause 11. The method of any preceding clause wherein the terminal is configured not to carry out, when the limited local radio connection is activated, any one or more of: monitoring of control channels for scheduling assignments from the mobile node and reporting on a channel quality measurement for a user data transmission channel with the mobile node.

Clause 12. The method of any preceding clause wherein the terminal is configured to, when the limited local radio connection is activated, carry out at any one or more of: monitoring of paging messages from the mobile node; acquiring system information transmitted by the mobile node; and controlling the terminal's mobility.

Clause 13. The method of any preceding clause comprising, upon failure of the full local radio connection, activating a full base station radio connection between the terminal and the base station;
wherein, optionally, when the full base station radio connection is activated, the terminal is operable to exchange user data with the base station.

Clause 14. The method of clause 13 wherein the terminal is configured to, when the full base station radio connection is activated, carry out at any one or more of: data transfer to or from the base station; acquiring system information transmitted by the base station; reporting on a channel quality measurement for a user data transmission channel with the base station and carrying out mobility instructions received from the base station.

Clause 15. The method of any preceding clause comprising, while the limited base station radio connection is activated:
the base station identifying a paging message intended for the terminal;
the base station transmitting the paging message to the terminal directly based on the terminal's limited base station radio connection state.

Clause 16. The method of one of clauses 1-14 comprising, while the limited base station radio connection is activated:
the base station identifying a paging message intended for the terminal;
the base station determining whether to send the paging message directly of via the mobile;
upon determination to send the paging message directly, transmitting the paging message to the terminal directly based on the terminal's limited base station radio connection state;
upon determination to send the paging message via the mobile node, transmitting the paging message to the mobile node for transmission to the terminal.

Clause 17. The method of clause 16 wherein the base station determining whether to send the paging message directly of via the mobile comprises:
determining whether one of the full local radio connection and of the limited local radio connection is activated;

if one of the full local radio connection and of the limited local radio connection is activated, determining to send the paging message via the mobile node;

if neither the full local radio connection nor the limited local radio connection is activated, determining to send the paging message directly.

Clause 18. The method of any preceding clause comprising, while the limited base station radio connection and the full local radio connection are activated:

the mobile node maintaining first radio connection context information for the terminal, the first radio connection context information being based on the full local radio connection;

the mobile node transmitting at least part of the first radio connection context information to the base station;

the base station maintaining second radio connection context information for the terminal based on the least part of the first radio connection context information received from the mobile node.

Clause 19. A mobile telecommunications network, the mobile telecommunications network comprising a base station providing wireless connectivity within a base station cell, a mobile node providing wireless connectivity within a local cell and configured to communicate with the base station and a terminal configured to communicate wirelessly with the base station and configured to communicate wirelessly with the mobile node; wherein the mobile telecommunications network is configured to:

activate a limited base station radio connection between the terminal and the base station; and activate one of a full local radio connection and a limited local radio connection between the terminal and the mobile node.

Clause 20. A mobile telecommunications network, the mobile telecommunications network comprising a base station providing wireless connectivity within a base station cell, a mobile node providing wireless connectivity within a local cell and configured to communicate with the base station and a terminal configured to communicate wirelessly with the base station and configured to communicate wirelessly with the mobile node; wherein the mobile telecommunications network is configured to carry out any one of the methods of clauses 1-18.

Clause 21. A method of operating a terminal use in a mobile telecommunications network, the mobile telecommunications network comprising a base station providing wireless connectivity within a base station cell, a mobile node providing wireless connectivity within a local cell and configured to communicate with the base station; wherein the terminal comprises a transmitter, a receiver and a controller and is configured to communicate wirelessly with the base station and to communicate wirelessly with the mobile node; the method comprising:

the terminal activating a limited base station radio connection between the terminal and the base station; and the terminal activating one of a full local radio connection and a limited local radio connection between the terminal and the mobile node.

Clause 22. The method of clause 21 wherein the method further comprises the terminal:

when the limited base station radio connection is activated, not exchanging user data with base station;

and/or when the full local radio connection is activated, exchanging user data with the mobile node; and/or when the limited local radio connection is activated, the terminal is not operable to exchange user data with the mobile node.

Clause 23. The method of any of clauses 21-22 further comprising, upon failure of the full local radio connection, the terminal activating a full base station radio connection between the terminal and the base station;

And further comprising, optionally, the terminal exchanging user data with the base station when the full base station radio connection is activated.

Clause 24. A terminal for use in a mobile telecommunications network, the mobile telecommunications network comprising a base station providing wireless connectivity within a base station cell, a mobile node providing wireless connectivity within a local cell and configured to communicate with the base station; wherein the terminal comprises a transmitter, a receiver and a controller and is configured to communicate wirelessly with the base station and to communicate wirelessly with the mobile node, wherein the terminal is further configured to:

activate a limited base station radio connection between the terminal and the base station; and activate one of a full local radio connection and a limited local radio connection between the terminal and the mobile node.

Clause 25. Circuitry for a terminal for use in a mobile telecommunications network, the mobile telecommunications network comprising a base station providing wireless connectivity within a base station cell, a mobile node providing wireless connectivity within a local cell and configured to communicate with the base station; wherein the circuitry comprises a controller element and a transceiver element configured to operate together to communicate wirelessly with the base station and to communicate wirelessly with the mobile node;

activate a limited base station radio connection between the terminal and the base station; and activate one of a full local radio connection and a limited local radio connection between the terminal and the mobile node.

Clause 26. A method of operating a mobile node in a mobile telecommunications network, the mobile telecommunications network comprising a base station providing wireless connectivity within a base station cell, wherein the mobile node is configured to provide wireless connectivity within a local cell and configured to communicate with the base station; and a terminal configured to communicate wirelessly with the base station and configured to communicate wirelessly with the mobile node, the method comprising the mobile node:

activating one of a full local radio connection and a limited local radio connection with the terminal while a limited base station radio connection is activated between the terminal and the base station.

Clause 27. A mobile node for use in a mobile telecommunications network, the mobile telecommunications network comprising a base station providing wireless connectivity within a base station cell, wherein the mobile node is configured to provide wireless connectivity within a local cell and configured to communicate with the base station; and a terminal configured to communicate wirelessly with the base station and configured to communicate wirelessly with the mobile node, the mobile node comprising a transmitter, a receiver and a controller and is configured to:

activate one of a full local radio connection and a limited local radio connection with the terminal while a limited base station radio connection is activated between the terminal and the base station.

Clause 28. Circuitry for a mobile node for use in a mobile telecommunications network, the mobile telecommunications network comprising a base station providing wireless connectivity within a base station cell, wherein the circuitry comprises a controller element and a transceiver element configured to operate together to provide wireless connectivity within a local cell and to communicate with the base station; and a terminal configured to communicate wirelessly with the base station and configured to communicate wirelessly with the mobile node, the controller element and transceiver element being further configured to operate together to:

activate one of a full local radio connection and a limited local radio connection with the terminal while a limited base station radio connection is activated between the terminal and the base station.

Clause 29. A method of operating a base station in a mobile telecommunications network, the base station comprising a transmitter, a receiver and a controller and being configured to provide wireless connectivity within a base station cell, the mobile telecommunications network comprising the base station, a mobile node providing wireless connectivity within a local cell and configured to communicate with the base station and a terminal configured to communicate wirelessly with the base station and configured to communicate wirelessly with the mobile node; the base station being configured to:

activate a limited base station radio connection with the terminal while one of a full local radio connection and a limited local radio connection is activated between the terminal and the mobile node.

Clause 30. A base station for use in in a mobile telecommunications network, the base station comprising a transmitter, a receiver and a controller and being configured to provide wireless connectivity within a base station cell, the mobile telecommunications network comprising the base station, a mobile node providing wireless connectivity within a local cell and configured to communicate with the base station and a terminal configured to communicate wirelessly with the base station and configured to communicate wirelessly with the mobile node; the base station being configured to:

activate a limited base station radio connection with the terminal while one of a full local radio connection and a limited local radio connection is activated between the terminal and the mobile node.

Clause 31. Circuitry for a base station for use in in a mobile telecommunications network, the circuitry comprises a controller element and a transceiver element configured to operate together to provide wireless connectivity within a base station cell, the mobile telecommunications network comprising the base station, a mobile node providing wireless connectivity within a local cell and configured to communicate with the base station and a terminal configured to communicate wirelessly with the base station and configured to communicate wirelessly with the mobile node; the controller element and transceiver element being further configured to operate together to:

activate a limited base station radio connection with the terminal while one of a full local radio connection and a limited local radio connection is activated between the terminal and the mobile node.

Clause 32. Computer software which, when executed by a computer, causes the computer to perform the method of any one of clauses 1-18, 21-23, 26 and 29.

Clause 33. A storage medium which stores computer software according to clause 32.

Clause 34. A method for use in a mobile telecommunications network, a mobile telecommunications network, a method of operating a terminal, a terminal, circuitry for a terminal, a method of operating a mobile node, a mobile node, circuitry for a mobile node, method of operating a base station, a base station, circuitry for a base station, computer software and a storage medium substantially as hereinbefore described with reference to the accompanying drawings.

Clause 35. Any preceding clause wherein the terminal, the mobile node and the base station are operable to communicate at least one of: a 3GPP communication protocol, an LTE communication protocol, a 4G communication protocol and a 5G communication protocol.

REFERENCES

[1] Holma H. and Toskala A., "LTE for UMTS OFDMA and SC-FDMA based radio access", John Wiley and Sons, 2009
[2] TS 36.331, v12.7.0, 2015-09, Technical Specification Document for "Evolved Universal Terrestrial Radio Access (E-UTRA); Radio Resource Control (RRC); Protocol specification"

The invention claimed is:

1. A method for use in a mobile telecommunications network that includes a base station providing wireless connectivity within a base station cell, a mobile node providing wireless connectivity within a local cell and configured to communicate with the base station, and a terminal configured to communicate wirelessly with the base station and configured to communicate wirelessly with the mobile node, the method comprising:
   activating, by the terminal, a limited base station radio connection between the terminal and the base station;
   activating, by the terminal in a case that the terminal receives a cell notification, a limited local radio connection between the terminal and the mobile node;
   activating, by the terminal in a case that the terminal receives a cell connection setup request instead of the cell notification, a full local radio connection between the terminal and the mobile node; and
   carrying out, by the terminal in a case that the full local radio connection is activated after the terminal receives the cell connection setup request, mobility instructions received from the mobile node without disconnection of the limited base station radio connection between the terminal and the base station, wherein
   the cell notification indicates a cell identifier for a local cell and a type of communication permissible via the limited local radio connection,
   the terminal and the base station do not exchange user data via the limited base station radio connection,
   the terminal and the mobile node do not exchange user data via the limited local radio connection, and
   the terminal and the mobile node exchange user data via the full local radio connection.

2. The method of claim 1, wherein the terminal exchanges user data with the mobile node in a case that both the limited base station radio connection is activated and the full local radio connection is activated.

3. The method of claim 1, wherein the mobile node is one of a terminal, a relay node, a device-to-device relay node, a dedicated local cell mobile node.

4. The method of claim 1, wherein
   upon activation of the full base station radio connection, the terminal is allocated a radio identifier, and
   in a case that one of the full local radio connection and the limited local radio connection is activated, the method further comprises the terminal notifying the mobile node of the radio identifier allocated.

5. The method of claim 1, wherein when the limited base station radio connection between the terminal and the base station is activated, the terminal is in a RRC state.

6. The method of claim 1, wherein in a case that the limited base station radio connection is activated, the terminal is configured to perform at least one of:
monitoring of paging messages from the base station;
acquiring system information transmitted by the base station;
controlling mobility of the terminal;
maintaining a C-RNTI identifier for the terminal in the base station cell;
maintaining radio bearer with the base station; and
carrying out mobility instructions received from the base station.

7. The method of claim 1, wherein in a case that the limited base station radio connection is activated, the terminal is configured to not perform any one or more of:
applying DRX control based on a DRX configuration from the base station, performing neighboring cell measurements based on measurement configuration information from the base station;
performing cell selection and/or reselection based on cell selection configuration information from the base station;
monitoring of control channels for scheduling assignments from the base station;
measurement reporting based on measurement reporting information from the base station;
reporting on a channel quality measurement for a user data transmission channel with the base station; and
performing logging of measurements.

8. The method of claim 1, wherein in the case that the full local radio connection is activated, the terminal is further configured to perform any one or more of:
data transfer to or from the mobile node;
acquiring system information transmitted by the mobile node; and
reporting on a channel quality measurement for a user data transmission channel with the mobile node.

9. The method of claim 1, wherein in a case that the limited local radio connection is activated, the terminal is configured to not perform one or more of:
monitoring of control channels for scheduling assignments from the mobile node; and
reporting on a channel quality measurement for a user data transmission channel with the mobile node.

10. The method of claim 1, wherein in a case that the limited local radio connection is activated, the terminal is configured to perform any one or more of:
monitoring of paging messages from the mobile node;
acquiring system information transmitted by the mobile node; and
controlling a mobility of the terminal.

11. The method of claim 1, further comprising:
activating, upon failure of the full local radio connection, a full base station radio connection between the terminal and the base station, wherein
the terminal and the base station exchange user data via the full base station radio connection.

12. The method of claim 11, wherein in a case that the full base station radio connection is activated, the terminal is configured to perform any one or more of:
data transfer to or from the base station; acquiring system information transmitted by the base station;
reporting on a channel quality measurement for a user data transmission channel with the base station; and
carrying out mobility instructions received from the base station.

13. The method of claim 1, further comprising, while the limited base station radio connection is activated:
identifying, by the base station, a paging message intended for the terminal;
transmitting, by the base station, the paging message to the terminal directly based on a limited base station radio connection state of the terminal.

14. The method of claim 1, further comprising, while the limited base station radio connection is activated:
identifying, by the base station, a paging message intended for the terminal;
determining, by the base station, whether to send the paging message directly via the mobile node;
transmitting, by the base station upon a determination to send the paging message directly, the paging message to the terminal directly based on a limited base station radio connection state of the terminal; and
transmitting, by the base station upon a determination to send the paging message via the mobile node, the paging message to the mobile node for transmission to the terminal.

15. The method of claim 14, wherein the determining whether to send the paging message directly of via the mobile node comprises:
determining whether one of the full local radio connection and the limited local radio connection is activated;
if one of the full local radio connection and the limited local radio connection is activated, determining to send the paging message via the mobile node; and
if neither the full local radio connection nor the limited local radio connection is activated, determining to send the paging message directly.

16. The method of claim 1, further comprising, while the limited base station radio connection and the full local radio connection are activated:
maintaining, by the mobile node, first radio connection context information for the terminal, the first radio connection context information being based on the full local radio connection;
transmitting, by the mobile node, at least part of the first radio connection context information to the base station; and
maintaining, by the base station, second radio connection context information for the terminal based on the least part of the first radio connection context information received from the mobile node.

17. A terminal for use in a mobile telecommunications network that includes a base station providing wireless connectivity within a base station cell, a terminal and a mobile node providing wireless connectivity within a local cell and configured to communicate with the base station, the terminal comprising:
a transmitter; a receiver; and
processing circuitry configured to control the transmitter and the receiver to:
activate a limited base station radio connection between the terminal and the base station;
activate, in a case that the terminal receives a cell notification, a limited local radio connection between the terminal and the mobile node;
activate, in a case that the terminal receives a cell connection setup request instead of the cell notification, a full local radio connection between the terminal and the mobile node; and in a case that the full local radio connection is activated after receiving the cell connection setup request, carry out mobility instructions received from the mobile node without disconnection of the limited base station radio connection between the terminal and the base station, wherein the cell notification indicates a cell identifier for a local cell and a type of communication permissible via the limited local radio connection, the terminal and the base station do not exchange user data via the limited base station radio connection, the terminal and the mobile node do not exchange user data via the limited local radio connection, and the terminal and the mobile node exchange user data via the full local radio connection.

18. A method of operating a mobile node in a mobile telecommunications network that includes a base station providing wireless connectivity within a base station cell, the mobile node and a terminal, wherein the mobile node is configured to provide wireless connectivity within a local cell and configured to communicate with the base station, and the terminal is configured to communicate wirelessly with the base station and configured to communicate wirelessly with the mobile node, the method comprising:

activating, in a case that the mobile node transmits a cell notification to the terminal, a limited local radio connection between the mobile node and the terminal;

activating, in a case that the mobile node transmits a cell connection setup request instead of the cell notification to the terminal, a full local radio connection between the mobile node and the terminal; and providing, by the mobile node in a case that the full local radio connection is activated after transmitting the cell connection setup request, mobility instructions to the terminal, wherein after reception of the mobility instructions, the terminal carries out the mobility instructions without disconnection of a limited base station radio connection between the terminal and the base station, the cell notification indicates a cell identifier for a local cell and a type of communication permissible via the limited local radio connection, and the limited local radio connection and the full local radio connection are activated while a limited base station radio connection is activated between the terminal and the base station.

\* \* \* \* \*